(12) United States Patent
Moreland

(10) Patent No.: US 8,272,211 B2
(45) Date of Patent: Sep. 25, 2012

(54) TIDE OPERATED ENERGY SYSTEM

(76) Inventor: Elvis A Moreland, Sonora, CA (US)

( * ) Notice: Subject to any disclaimer, the term of this patent is extended or adjusted under 35 U.S.C. 154(b) by 751 days.

(21) Appl. No.: 12/229,775

(22) Filed: Aug. 26, 2008

(65) Prior Publication Data

US 2010/0052327 A1    Mar. 4, 2010

(51) Int. Cl.
*F16D 31/02* (2006.01)
(52) U.S. Cl. .................................................. 60/398
(58) Field of Classification Search .................. 60/398; 417/332, 334
See application file for complete search history.

(56) References Cited

U.S. PATENT DOCUMENTS

| | | | | |
|---|---|---|---|---|
| 4,184,807 A | * | 1/1980 | Berg | 60/398 |
| 4,380,419 A | * | 4/1983 | Morton | 60/398 |
| 4,622,812 A | * | 11/1986 | Thompson et al. | 60/398 |
| 6,006,518 A | * | 12/1999 | Geary | 60/398 |
| 6,023,105 A | * | 2/2000 | Youssef | 290/54 |
| 6,420,794 B1 | * | 7/2002 | Cao | 60/398 |
| 6,546,723 B1 | * | 4/2003 | Watten et al. | 60/398 |

FOREIGN PATENT DOCUMENTS

GB          1452483    * 10/1976

* cited by examiner

*Primary Examiner* — Michael Leslie
(74) *Attorney, Agent, or Firm* — David Dreyfuss; Moore Patents

(57) ABSTRACT

An ocean tide energy conversion system is disclosed which uses incoming and outgoing tidal flows into a flume with a power wheel and power increaser to furnish power to a turbine pump to lift ocean water into an elevated holding reservoir. Electrical energy is produced when the water in the reservoir flows through a penstock to operate a generator before it is returned to the ocean. This system is completely operated by tidal flows.

7 Claims, 11 Drawing Sheets

10

11

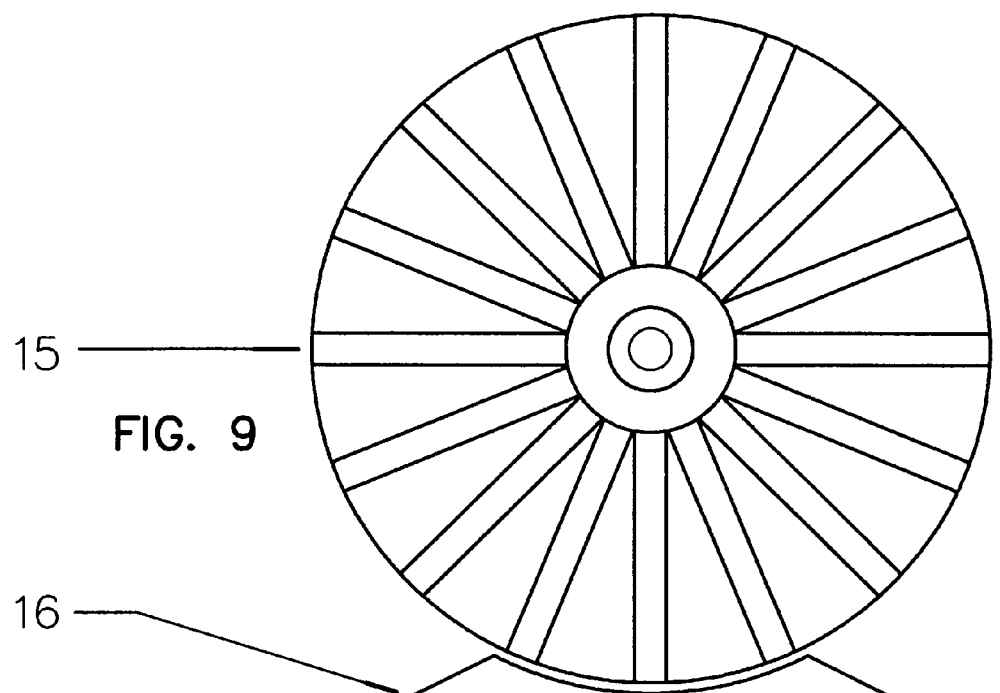

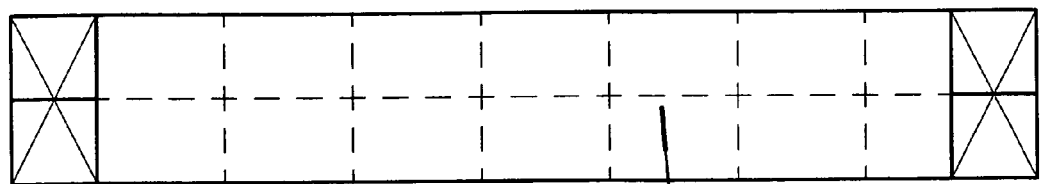
FIG. 15  — 21
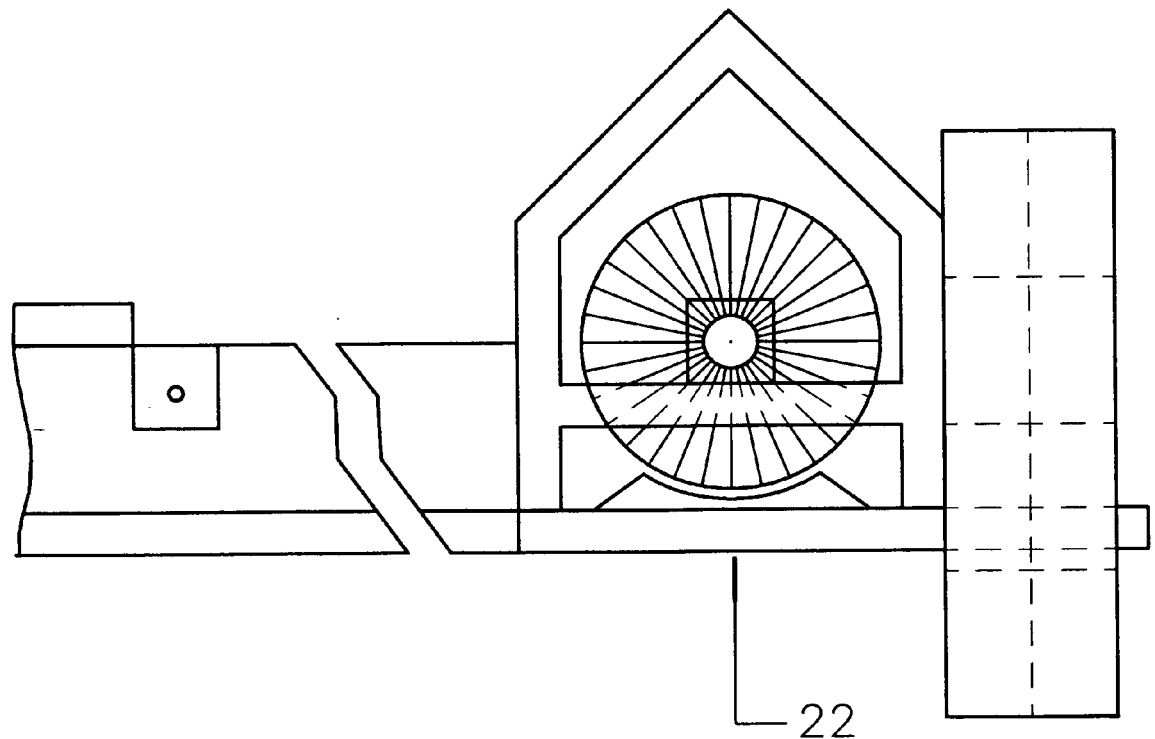
— 22
FIG. 16

TIDE OPERATED ENERGY SYSTEM

BACKGROUND

This energy producing system is designed to use the ocean tides for the inexpensive and clean production of electrical energy that does not pollute or destroy large areas of the environment. It does not depend on oil, coal, or nuclear energy sources that are all contaminants.

Wind power sources, though clean, are intermittent and reliant on weather patterns that are not as constant as the tides. The tides are a clean, dependable and natural source of energy that is available 24 hours a day and will last as long as the earth does.

Prior Art:

1. Water operated wheels of all types for generating power to operate machinery but not tide operated.
2. Thermal expansion types that were tested near the Hawaiian Islands were government financed but failed to produce enough surplus energy to be profitable.
3. Several different types of tide surge experiments were tried in Ireland but no constant amount of energy could be produced by them.
4. Several types of flotation systems were tried off the California coast but again they failed to produce positive results.
5. California does not list any projects being discussed at this time in their energy publications.

SUMMARY OF THE INVENTION

Incoming tide operates a power wheel linked to a pump through a series of gears and drive linkage lifting ocean water to a holding reservoir. Water flowing out of the holding reservoir turns a turbine that powers an electrical generator. The holding reservoir is sized as required with an elevation to effectively operate turbine continuously. The outgoing tide reverses this operation, so that the operation cycle is continuous. Elevation of the holding reservoir should be 125 feet or more above sea level to efficiently produce electricity.

BRIEF DESCRIPTION OF THE DRAWINGS

FIG. 9 shows an end view of a power wheel.

FIG. 10 shows a power support bracket.

FIG. 11 shows a cutaway view of a stainless steel reinforced fiberglass panel.

FIG. 12 shows a side view of a stainless steel reinforced fiberglass panel.

FIG. 13 shows an end view of a stainless steel reinforced fiberglass panel.

FIG. 15 shows a plan view of a float assembly.

FIG. 16 shows an elevation view of a power wheel drop-in unit.

DETAILED DESCRIPTION

Operation

First Embodiment

Incoming tide drives the power wheel which mechanically operates pump. The pump lifts seawater to holding reservoir. Holding reservoir is at an elevation of 125 feet plus above high tide. Water flows out of the holding reservoir through a turbine in a power house to generate electricity.

Outgoing water from a tide basin reverses the power wheel so pump will continue to operate. Reversing gear box at pump changes rotation so pump rotates in one continuous direction. Two gear boxes in the power train increase RPM of power wheel. RPM of power wheel needs to meet pump speed of 1,750 RPM. Additional sea water (25%) is needed for operation at slack tide in 24 hour cycle. Additional sea water also supplies continuous flow at turbine from holding reservoir.

Operating Details

Figure 1:
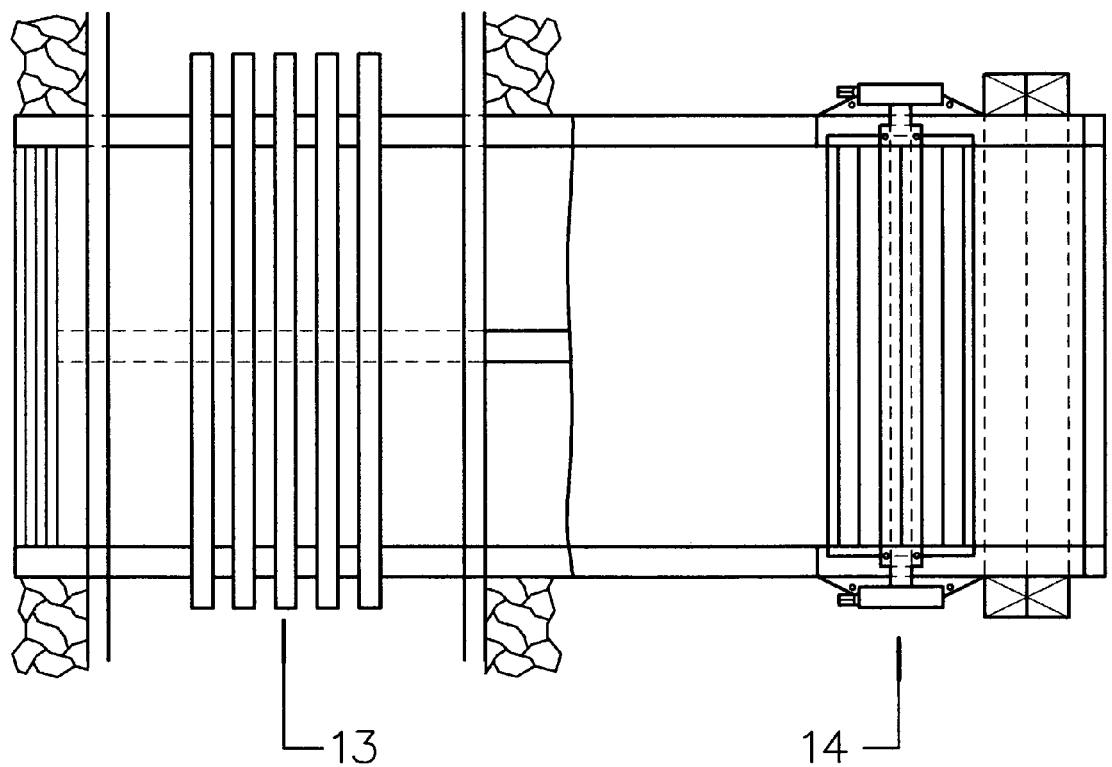
FIG. 1 shows an overall site plan of a tide operated energy system.
Figure 2:
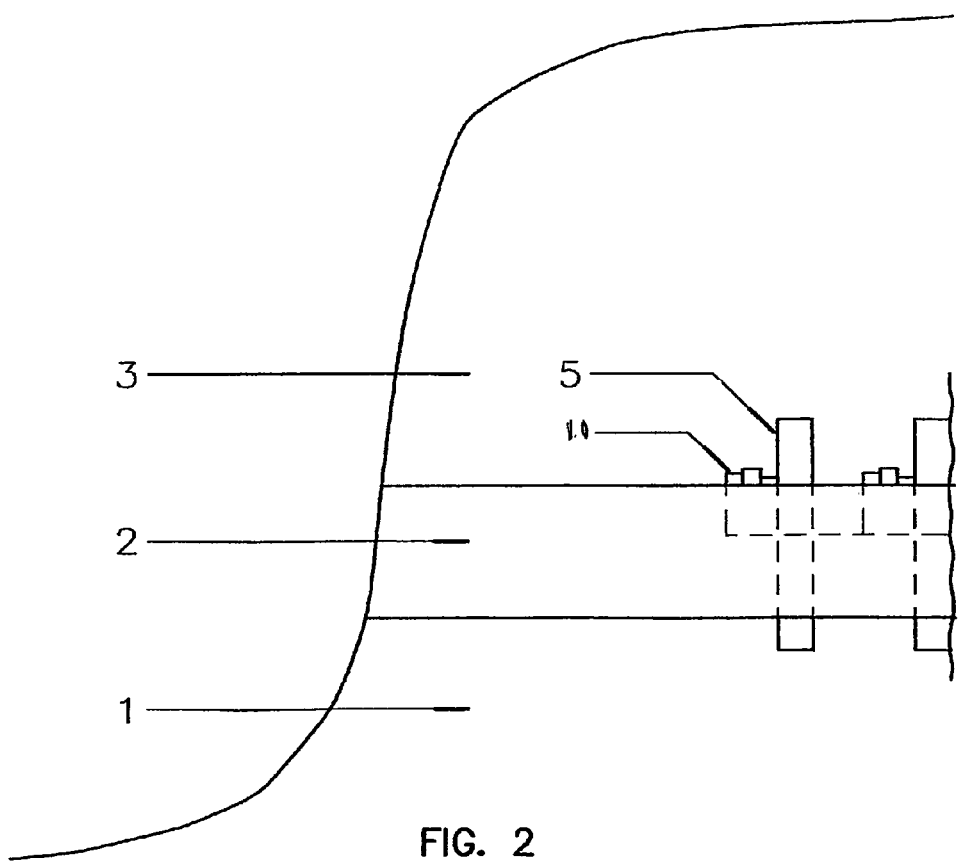
FIG. 2 shows a site plan of a tide operated energy system.
Figure 3:
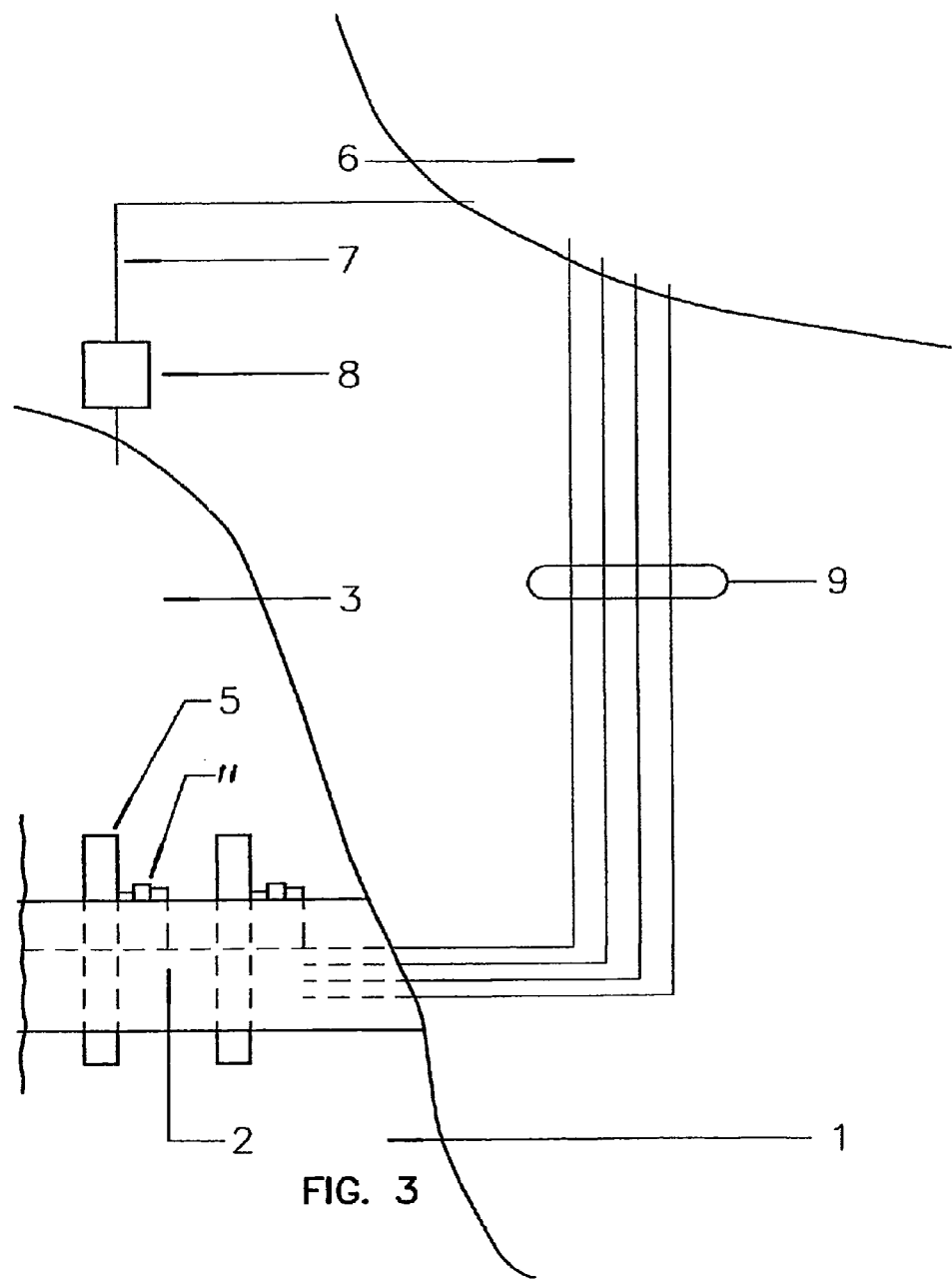
FIG. 3 shows another site plan of a tide operated energy system.
Figure 4:
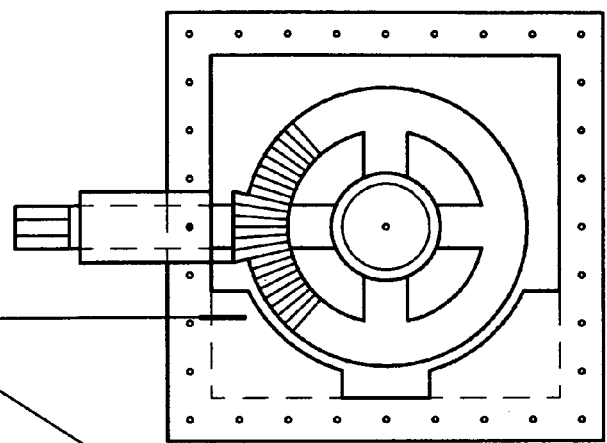
FIG. 4 shows a gearbox and cover.
Figure 5:
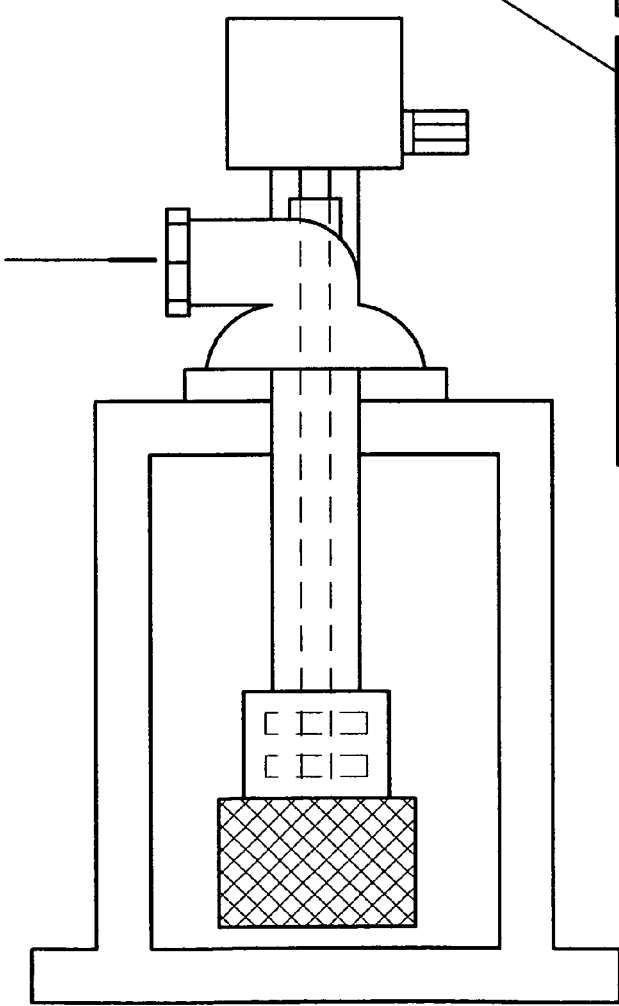
FIG. 5 shows a 12" turbine pump.
Figure 6:
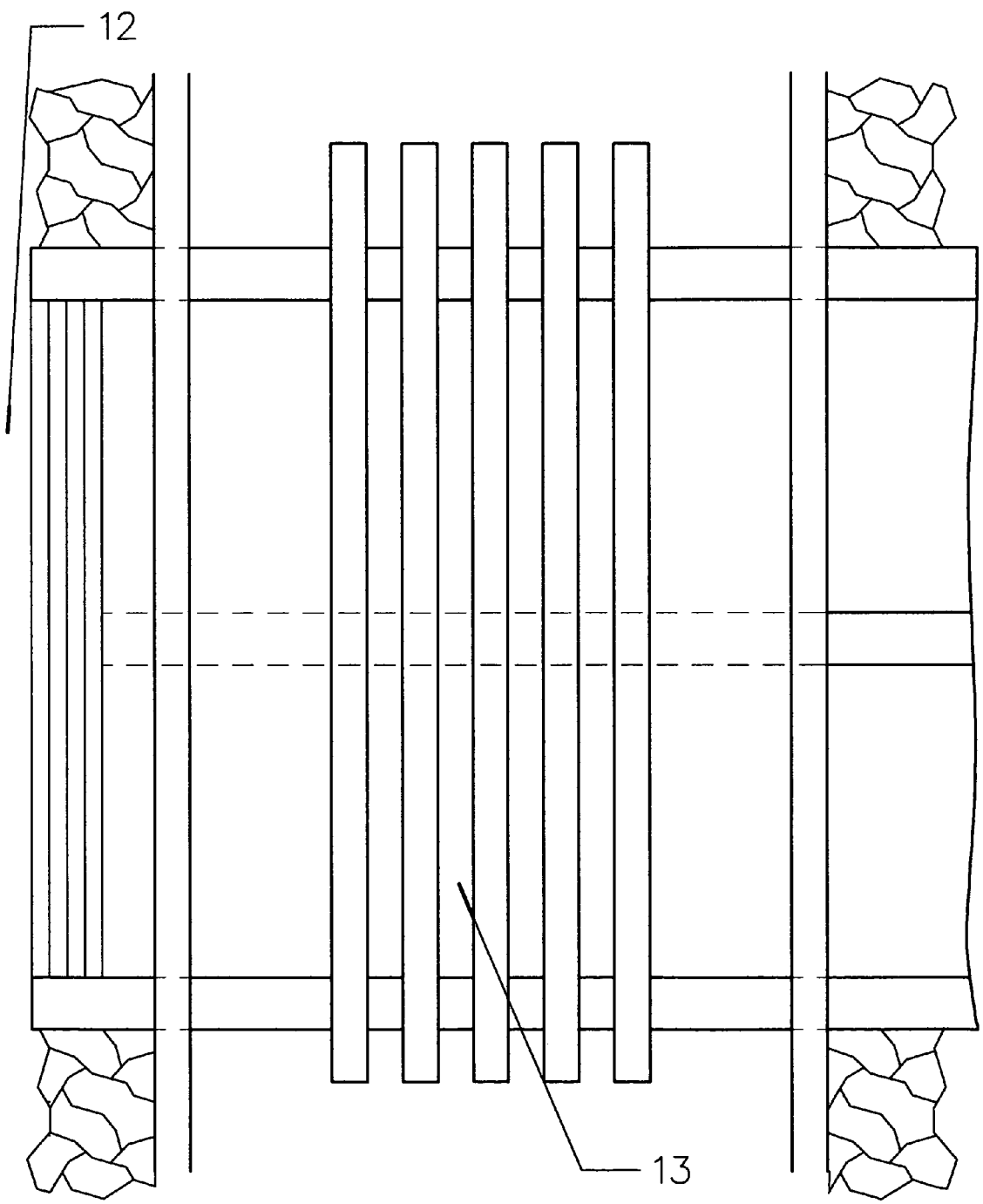
FIG. 6 shows a plan view of causeway flume and supply pipes.
Figure 7:
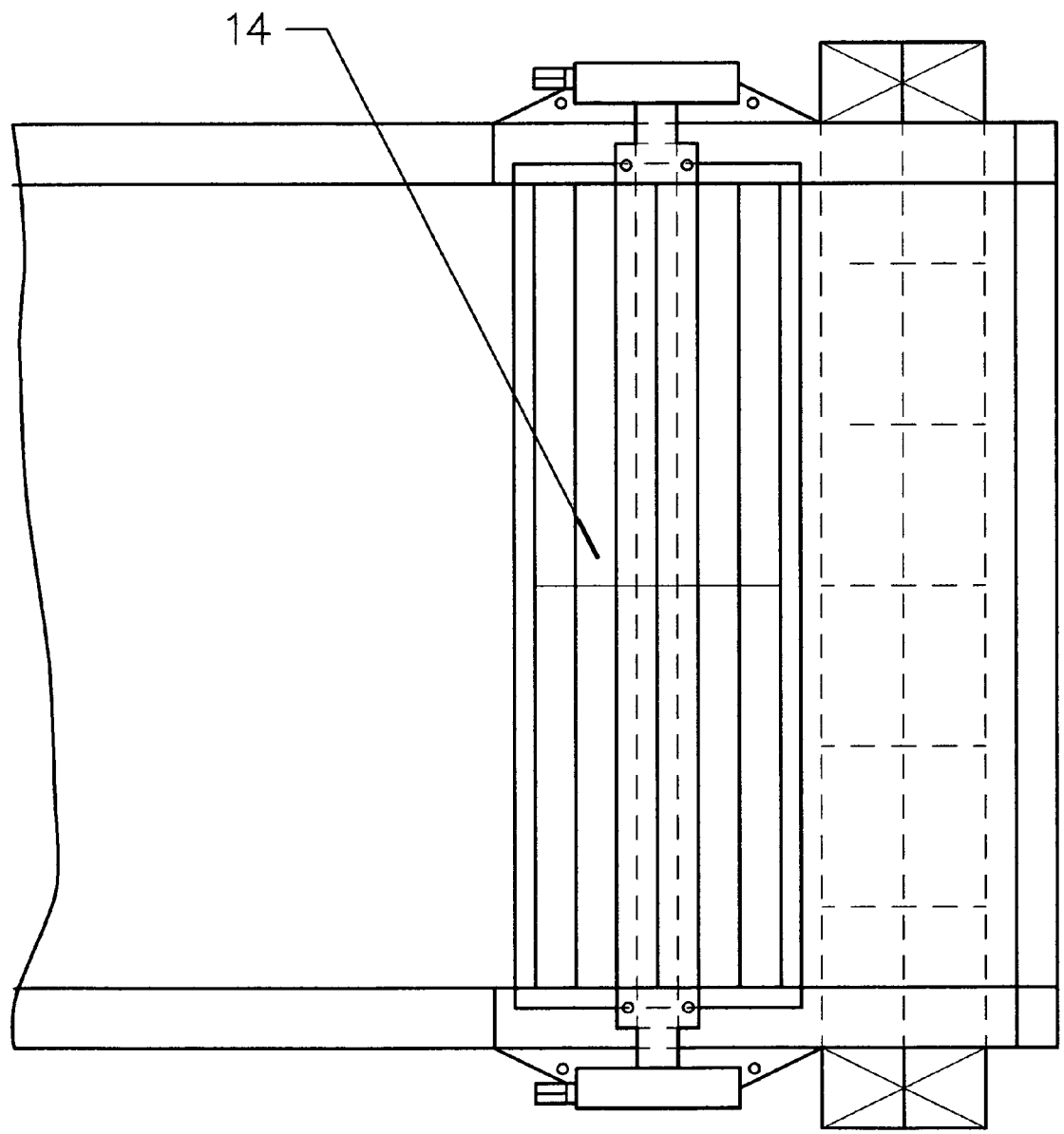
FIG. 7 shows a power wheel drop-in unit.
Figure 8:
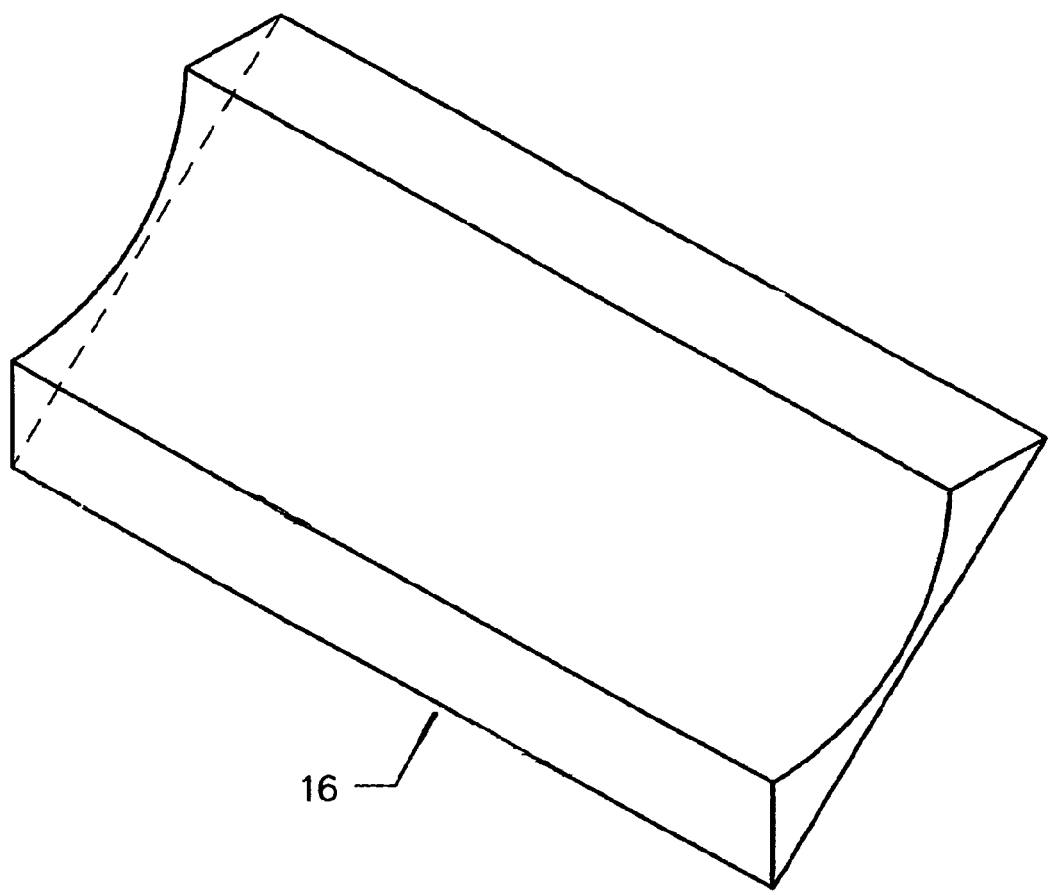
FIG. 8 shows a detail drawing of a power increaser.
Figure 14:
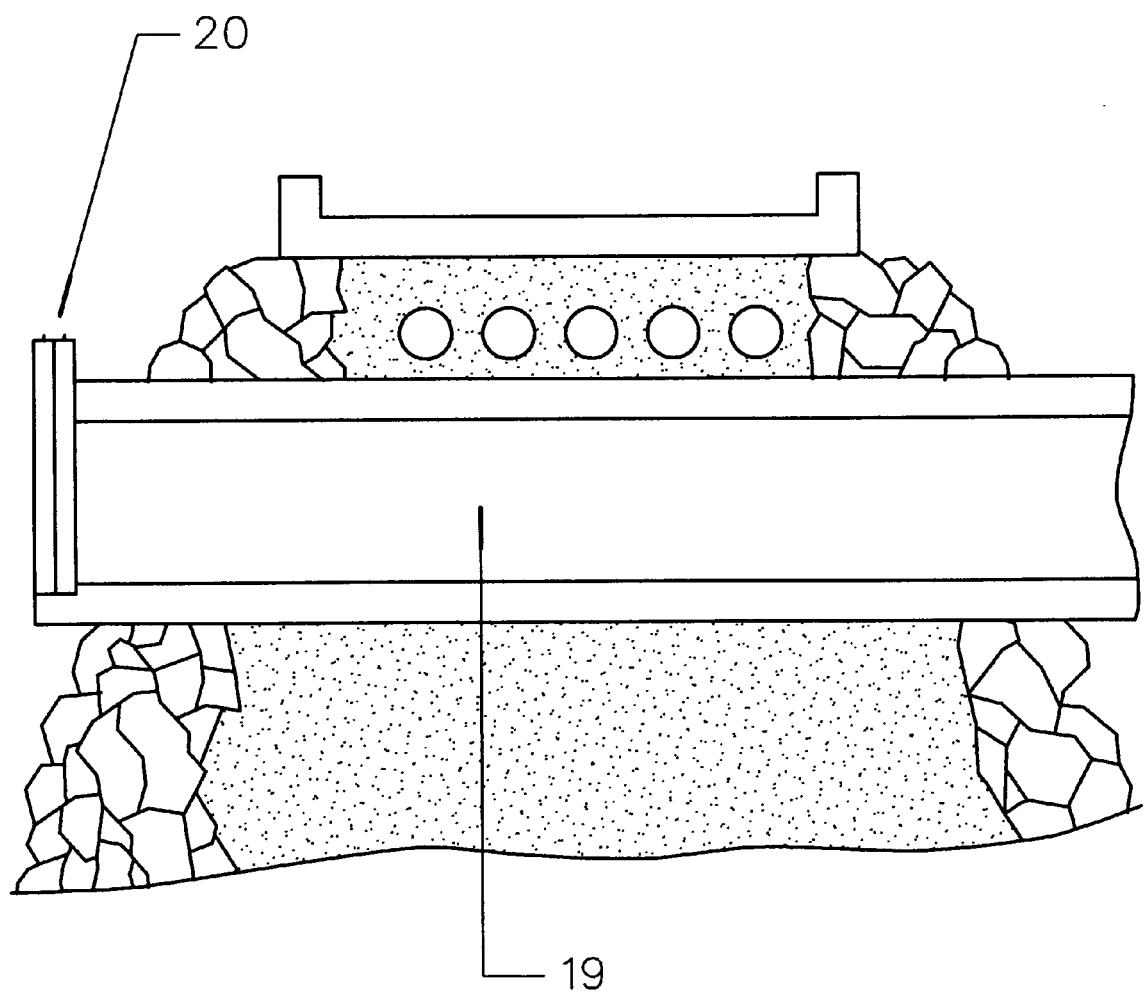
FIG. 14 shows a cross-section of causeway flume and supply pipes.
Figure 17:
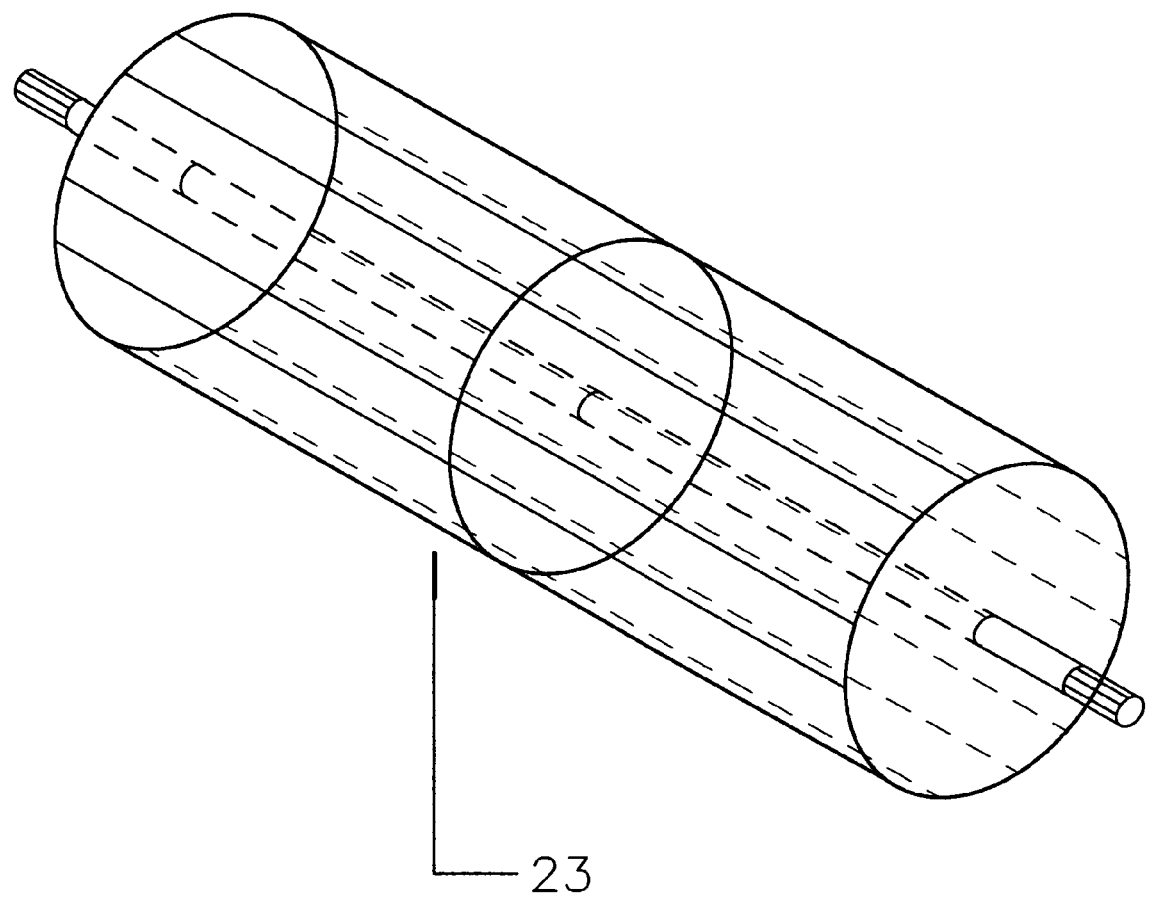
FIG. 17 shows an isometric view of a power wheel.

The ocean (FIG. 2, #1) tide is channeled utilizing a causeway (FIG. 2, #2). Causeway size to be determined by chosen site. The causeway structure will contain a Tide Basin (FIG. 2, #3). A Turbine Pump (FIG. 2, #11) is connected to a Power Wheel (FIG. 9, #15), located at the end of a Flume (FIG. 2, #5). The Flume (FIG. 2, #5) carries the water to and from the Power Wheel (FIG. 9, #15, with a Power Increaser (FIG. 8, #16). An increasing Gear Box (FIG. 4, #10) is used to increase the RPM of the Power Wheel to operating RPM. Ocean Water flows over a Power Increaser (FIG. 8 and FIG. 9, #16) and past the Power Wheel. Ocean Water turns the Power Wheel (FIG. 9, #15) by pressure against Power Wheel Panels (FIG. 11, FIG. 12 and FIG. 13 (end view), #18). The Tide Basin (FIG. 2, #3) provides a constant source of water flow for the Power Wheel (FIG. 9, #15). A Float Assembly (FIG. 15, #21) maintains the level of water flowing past the Power Wheel Panels (FIG. 11, FIG. 12 and FIG. 13 (end view), #18). Float Assembly (FIG. 15, #21) raises or lowers a Power Wheel Drop-in unit (FIG. 16, #22). The Turbine Pump (FIG. 2, #11 and FIG. 5, #11—elevation view) lifts the water from tide basin (FIG. 2, #3) to an Elevated Holding Reservoir (FIG. 3, #6). The Elevated Holding Reservoir (FIG. 3, #6) is required to operate an electric generator in a Power House (FIG. 3, #8). Discharge Pipes (FIG. 3, #9) deliver the water from the pumps to the Holding Reservoir (FIG. 3, #6). A Penstock (FIG. 3, #7) delivers the water from the Holding Reservoir (FIG. 3, #6) to the Power House Location (FIG. 3, #8). Water turns the turbine which turns a generator to create electricity in the Power House. The Power House (FIG. 3, #8) is located at High Tide for the chosen site.

Suggested Materials

The Power Wheel (FIG. 9, #15) frame should be made of salt water compatible material. The Power Wheel Panels (FIG. 11, FIG. 12 and FIG. 13 (end view), #18) will be attached to the Power Wheel using Panel Support Brackets (FIG. 10, #17). The Power Wheel Panels (FIG. 11, FIG. 12 and FIG. 13 (end view), #18) should be made of a lightweight, strong material that is resistant to the effects of Salt Water— Fiberglass with Stainless Steel reinforcing mesh is the recommended material. Panel Support Brackets (FIG. 10, #17) should be made of salt water compatible material.

Design Criteria
1. The location to be used should be determined by height of tides, with a 4 foot minimum.
2. Site chosen to be determined by depth of ocean and location of holding reservoir for sea water. The available material to build the necessary causeway for power wheel location is a consideration.
3. A study should be done on the site chosen based on the history of ocean storms and tsunamis will be a major consideration for each site selected.
4. Environmental impact is also a major consideration for the location chosen this should not be an insurmountable problem. There are no pollutants disbursed as a result of the use of this system.

The size of this system will be governed by the capacity of the tide water basin, height of tides, length of causeway required for the number of power wheels to be used. Also, the capacity of holding reservoir should be sized for the amount of sea water required for the efficiency of the system.

Formula for this system requires
1. The height of the tides at the proposed site should be 4 feet to 6 feet or more.
2. The number of power wheels being considered for the site.
3. Size of pumps that can be operated at site chosen.
4. The acre feet of area of tide basin that can be built at site and can be used effectively.
5. An area near site chosen where a holding reservoir can be constructed for the pumped ocean water large enough to store all the water pumped in the tide cycles plus the amount necessary for constant operation of turbines during tide changes.
6. This reservoir will have to be at an elevation to create the necessary head pressure required for the operation of the turbine chosen at 125 feet or more.

A tide operated system can be adapted to an untold number of locations worldwide. Conditions should exist where there is a 3 foot or greater tide 365 days a year. A 125 foot or more elevation for a holding reservoir will need to be available. This system is clean and inexpensive to build and operate. A tide operated system does not depend on the weather, wind, hydro carbons or nuclear energy.

A tide operated energy system can be built and maintained at a lower cost than a natural gas powered generator. This system will also not use up our natural resources that will be depleted in the next century.

The US is using up the greater part of our oil and gas supply. The first oil well was drilled in Pennsylvania in 1859, only 148 years ago. We have severely depleted oil reserves in what amounts to a blip in time over the earth's history. The importation of foreign oil is not sustainable at current prices.

There are areas where prevailing winds produce energy but with no wind, no power. Solar power is abundant, inexpensive, clean, quiet and non-polluting. If there is no sun, there is no power. These are not reliable power sources.

Tide power is quiet, clean, inexpensive and non-polluting day and night forever so we should utilize it.

There are numerous locations around the world that could use a tide operated energy system effectively. Some examples are islands and small countries with ocean coastal areas. There is also a potential for development of increased seafood supply. Fish enhancement, oyster farms and most shell fish could produce more food. Our population is increasing quickly and our food supply is not keeping up with demands.

I claim:

1. A system for generating electricity comprising
 a causeway channeling ocean tide and containing a tidal basin,
 a flume carrying tidal flow to and from a power wheel,
 a pump driven mechanically by said power wheel wherein said pump is capable of lifting seawater to a holding reservoir,
 a penstock connecting said holding reservoir to a generator turbine;
 wherein the power for driving said power wheel comes solely from tidal flow,
 wherein said power wheel is operable to drive the pump from both incoming and outgoing tides, and
 wherein the holding reservoir is large enough to store the water pumped in the tide cycles plus the amount necessary for constant operation of said generator turbine during tide changes.

2. The system of claim 1, wherein said generating turbine is located at about the high tide level and said holding reservoir is at least 125 feet above high tide.

3. The system of claim 1, wherein the minimum tide height is four feet.

4. The system of claim 1, further comprising a reversing gear box operable such that said pump rotates in one continuous direction.

5. The system of claim 1, further comprising a gear box operable to increase RPM to meet a pump speed of 1,750 RPM.

6. The system of claim 1, further comprising a float assembly operable to maintain the level of water flowing past power wheel panels, wherein ocean water turns said power wheel by pressure against said power wheel panels.

7. A method of generating electrical power comprising
 channeling ocean tide into and out of a tidal basin and through a flume to and from a power wheel,
 using said power wheel to mechanically drive a pump to lift seawater from said tidal basin to a holding reservoir, and
 returning said seawater through a penstock to a generator turbine;
 wherein the power for driving said power wheel comes solely from tidal flow,
 wherein said power wheel is operable to drive the pump from both incoming and outgoing tides, and
 wherein the holding reservoir is large enough to store the water pumped in the tide cycles plus the amount necessary for constant operation of said generator turbine during tide changes.

* * * * *